Patented July 17, 1928.

1,677,304

UNITED STATES PATENT OFFICE.

FREDERICK W. SPERR, JR., OF PITTSBURGH, PENNSYLVANIA, ASSIGNOR TO THE KOPPERS COMPANY, A CORPORATION OF PENNSYLVANIA.

GAS-PURIFICATION PROCESS.

No Drawing.  Application filed December 31, 1926.  Serial No. 158,424.

This invention relates to processes of purifying fuel gas from acidic impurities such as hydrogen sulphide and hydrogen cyanide by means of an alkaline absorbent liquid recirculated through a cycle comprising an absorption stage and an actification stage.

An object of my invention is to provide a process for purifying gas in which a cheap and available absorbent liquid is employed. A second object of my invention is to increase the efficiency of gas purification processes of the character indicated.

My invention has for further objects such other operative advantages or results as may hereinafter be found to obtain.

My invention contemplates the use of a cheap and readily available by-product of the cellulose industries, as alkaline absorbent liquid.

Caustic soda solutions are used in the artificial silk industry and other industries of like general character in large amounts. For example, in the preparation of viscose solutions, cellulose is treated with a solution of caustic soda. The bulk of the cellulose is insoluble in the caustic solution but is acted upon to some extent by the latter and swells, while a small portion of the cellulose dissolves. This soluble portion is known as hemi-cellulose.

Most forms of cellulose contain small amounts of this soluble cellulose. When the swollen cellulose is pressed for the removal of the caustic solution, the hemi-cellulose is not retained but remains in the solution in the ex-pressed liquid. It is, of course, desirable to use the caustic solution over and over but the accumulation therein of hemi-cellulose limits its continued use and makes it necessary to discard the caustic solution from time to time.

A specific waste liquor from the artificial silk industry contains 16% NaOH and 0.5% of hemi-cellulose. Other waste liquors from analogous industries are comparable to this specific example. The presence of hemi-cellulose in such liquors makes them undesirable for many purposes where such caustic solutions might otherwise be used.

I have found that such a waste liquor may be used to advantage in processes of gas purification involving the use of alkaline solutions or suspensions. I utilize such solutions to supply the alkaline agent in gas purification processes and I have found that certain advantages accrue and certain procedures are preferably adopted when it is so used.

Gas purification processes involving the use of alkaline absorbent agents are, in general, divided into two classes—first, those processes in which sodium carbonate solutions or the like are circulated over the gas for absorption of impurities and subsequently over a current of air for volatization and removal of said impurities; second, those processes in which a body of liquid, after absorption of impurities, is aerated for regeneration in the presence of a material capable of preventing the liberation of hydrogen sulphide. In the second class of process, free sulphur may be liberated during actification. My invention lends itself to the performance of either of these processes.

With respect to the second class of process, I have found that the waste liquor containing hemi-cellulose is preferably added to the recirculated liquid after actification thereof and before the liquid is used for treatment of further quantities of gas. In this manner, I avoid reaction between sodium hydroxide and sulphur in the presence of oxygen, with the resultant formation of sodium thiosulphate or other inert by-product. Moreover, the gas being purified generally contains carbon dioxide and, as the recirculated liquor, now reinforced with sodium hydroxide, enters the absorption stage, the carbon dioxide present in the gas is rapidly absorbed, causing a formation of sodium carbonate according to the following reaction:

$$2NaOH + CO_2 = Na_2CO_3 + H_2O.$$

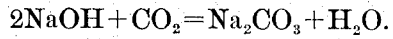

I have found that, although the presence of hemi-cellulose renders waste liquor of the character indicated above unsuitable for almost every other purpose, it does not interfere with the purification of gas in this manner and may even constitute an advantage, in that the hemi-cellulose increases the efficiency of flotation and removal of the liberated sulphur.

With respect to the use of alkaline solutions, as in the first class of processes decribed above, it may be stated that it is more difficult to obtain a complete purification of gas from acidic constituents with simple alkaline solutions than is true of processes of the second class involving the use of suspensions or solutions of metallic compounds. However, since the re-activity and absorptive character of the waste liquor indicated above is relatively very great, by introducing such liquor into the path of the gas at a point near the end of the absorption stage or in a separate stage subsequent to the treatment of the gas with a simple alkaline solution, the purification of the gas may be carried to substantial completion.

It is well known that, with the same amount of $Na^+$ ions, the reactivity of NaOH and $H_2S$ is higher than the reactivity of $Na_2CO_3$ and $H_2S$ on account of the higher alkalinity of the NaOH. For this reason, sodium in the form of sodium hydroxide is superior to sodium in the form of sodium carbonate for the removal of hydrogen sulphide from gas. It is, however, necessary for good actification that the sodium be in the carbonate form.

My process may be applied with particularly good results to such a process of gas purification as is described and claimed in copending application Serial No. 603,062, filed Nov. 4, 1922, of Eugene F. Bird, and assigned to The Koppers Company. In this application, there is shown a process of gas purification involving an absorption in two stages, in the second of which the gas, after receiving an initial purification in the first stage, is passed through a bed of coke, wood shavings, or the like, over which is sprayed an absorbent solution. In adapting my invention to this process, I preferably accomplish the initial stage purification in the usual manner with sodium carbonate solution or the like, and subsequently pass the gas through a bed kept saturated with waste alkaline liquor, as described above. In this manner, a very efficient purification of fuel gas may be obtained.

My invention utilizes a waste product unsuitable for most purposes in an effective manner and to the increased efficiency of a gas purification process and provides an extremely cheap source of material for the same.

My invention is not limited to the specific examples given hereinabove by way of example but may variously be embodied within the scope of the following claims.

I claim as my invention:

1. The process of regenerating a liquid previously used for purifying gas from acidic impurities which comprises subjecting it to the action of air in the presence of hemi-cellulose.

2. The process of purifying gas from acidic impurities which comprises recirculating an absorbent liquor containing hemi-cellulose through a cycle consisting of an absorption stage for the removal of impurities from the gas and an actification stage for regeneration of the liquor for further use.

3. The process of purifying gas from acidic impurities which comprises recirculating an alkaline liquid over the gas and through an actification stage and introducing into said recirculated liquid, after actification thereof and prior to contact with the gas to be purified, a solution of sodium hydroxide containing hemi-cellulose.

4. The process of purifying gas from acidic impurities which comprises subjecting the gas to the action of a soda solution for removal of the bulk of such impurities and introducing a solution of sodium hydroxide containing hemi-cellulose into contact with the gas after said removal of the bulk of the impurities to remove the remaining impurities.

5. The process of purifying gas from acidic constituents which comprises subjecting the gas to contact with a soda solution for removal of the bulk of such impurities and subsequently subjecting the thereby partially purified gas to contact with a sodium hydroxide solution containing hemi-cellulose for removal of the remainder of such impurities.

6. The process of purifying gas from acidic impurities which comprises treating the gas with a soda solution for the removal of the bulk of such impurities, subsequently treating the gas for the removal of the remainder of such impurities with a solution of sodium hydroxide containing hemi-cellulose, joining the fouled liquids from said primary and secondary absorption stages for actification and further use in the primary absorption stage and adding fresh solution to the secondary stage.

7. The process of purifying gas from acidic impurities which comprises recirculating a waste alkaline liquor from the treatment of cellulose through a cycle consisting of an absorption stage for the removal of impurities from the gas and an actification stage for regeneration of the liquor for further use.

8. The process of purifying gas from acidic impurities which comprises recirculating waste alkaline liquor from the manufacture of artificial silk from viscose through a cycle consisting of an absorption stage for the removal of impurities from the gas and an actification stage for regeneration of the liquor for further use.

In testimony whereof, I have hereunto subscribed my name this 30th day of December, 1926.

FREDERICK W. SPERR, Jr.